US006317703B1

(12) United States Patent
Linsker

(10) Patent No.: US 6,317,703 B1
(45) Date of Patent: Nov. 13, 2001

(54) SEPARATION OF A MIXTURE OF ACOUSTIC SOURCES INTO ITS COMPONENTS

(75) Inventor: Ralph Linsker, Millwood, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/953,591

(22) Filed: Oct. 17, 1997

Related U.S. Application Data

(60) Provisional application No. 60/030,499, filed on Nov. 12, 1996.

(51) Int. Cl.[7] .................................................... H04B 15/00

(52) U.S. Cl. .......................... 702/190; 702/191; 381/94.3

(58) Field of Search ................................. 381/94.1, 94.3, 381/71.1–71.14; 702/190, 191; 367/119, 121

(56) References Cited

U.S. PATENT DOCUMENTS 5,315,532 * 5/1994 Comon ................................. 702/196
5,539,832 * 7/1996 Weinstein et al. .................. 381/94.1
5,825,671 * 10/1998 Deville ................................ 702/191
5,848,163 * 12/1998 Gopalakrishnan et al. ........... 381/56
6,002,776 * 12/1999 Bhadkamkar et al. ................ 381/66

* cited by examiner

*Primary Examiner*—Forester W. Isen
*Assistant Examiner*—Brian Tyrone Pendleton
(74) *Attorney, Agent, or Firm*—McGuireWoods, LLP; Daniel P. Morris, Esq.

(57) ABSTRACT

A method and apparatus for processing a composite acoustic signal to reconstruct an acoustic signal that substantially matches a selected one of a plurality of sources. A plurality of microphones positioned at different spatial locations detect. variations in sound pressure level resulting from the activity of a plurality of acoustic sources at different locations. The outputs of the microphones are sampled and digitized, and the resulting digital waveform from each microphone is provided as an input to a corresponding filter bank. The outputs of the filter banks are input to a comparison unit. A comparison control unit generates "signature" information that characterizes each source with respect to the microphones. The comparison unit receives "signature" information of a selected source from the comparison control unit and provides an output to a synthesizer unit which produces a synthesized digital waveform for the selected source. Optionally, the synthesized digital waveform is input to a digital-to-analog (D/A) converter to generate an analog signal of the reconstructed source.

19 Claims, 10 Drawing Sheets

SEPARATION OF A MIXTURE OF ACOUSTIC SOURCES INTO ITS COMPONENTS

CROSS-REFERENCE TO RELATED APPLICATION

This application claims priority to co-pending U.S. Provisional application Ser. No. 60/030,499 filed Nov. 12, 1996.

DESCRIPTION

BACKGROUND OF THE INVENTION

1. Field of the Invention

The present invention generally relates to acoustic signal processing and, more particularly to a method and apparatus for reconstructing an acoustic signal that substantially matches one of a plurality of sources while eliminating other interfering sources.

2. Background Description

In a typical scenario, two or more acoustic sources, at different locations, are simultaneously active. The composite sound pressure level is measured at a number of locations that is typically less than the number of acoustic sources. The problem is to reconstruct an acoustic signal that substantially matches any selected one of the sources, while substantially eliminating the other interfering sources. This is often referred to as the "cocktail-party" processing problem. A solution to this problem has applications to enhanced speech recognition, hearing aids, and improved detection of speech or other sound sources in acoustically cluttered environments.

SUMMARY OF THE INVENTION

It is therefore an object of the invention to provide a signal processing method which is reconstructs an acoustic signal that substantially matches a selected one of a plurality of sources.

It is another object of the invention to provide a signal processing apparatus which measures a composite sound pressure level at a number of locations less than a number of acoustic sources and reconstructs an acoustic signal that substantially matches a selected one of a plurality of sources.

According to the invention, two or more microphones are positioned at different locations to detect the variations in sound pressure level resulting from the activity of a plurality of acoustic source at different locations. The outputs of the microphones are sampled and digitized, and the resulting digital waveform from each microphone is provided as an input to a corresponding filter bank. The outputs of the filter banks are input to a comparison unit. A comparison control unit generates "signature" information that characterizes each source with respect to the microphones. The comparison unit receives "signature" information of a selected source from the comparison control unit and provides an output to a synthesizer unit which produces a synthesized digital waveform for the selected source. Optionally, the synthesized digital waveform is input to a digital-to-analog (D/A) converter to generate an analog signal of the reconstructed source.

In operation, the digital waveforms are provided as input to the filter banks. The filter banks are chosen so as to produce "sparse representations" as output. The filters which comprise the filter banks are preferably digital filters, and the output values of each digital filter at each of a plurality of discrete times is a complex-valued number, called the "filter output value". For each of the digital waveforms, the set of these filter output values (over a plurality of times, and for the entire set of filters) is referred to as a "filter output pattern". Any particular filter output value of a filter output pattern is identified by a "label" that uniquely describes both (a) the index of the filter that generated that filter output value and (b) the time at which it was generated. The comparison control unit generates control information including a set of comparison parameters and information specifying which labels from each filter bank are to be used in a comparison of filter output values. The filter output values Of the specified labels from the several filter banks are compared by the comparison unit. The comparison consists of computing a function of (a) these quantities and (b) the comparison parameters. The result of the comparison is a decision that the filter output values are a "match" or a "non-match". If the result is a "match", the filter output values are used to compute a complex-valued number called the "filter target value". If the result is a "non-match", the filter target values are defined to be zero.

In this way, there is generated a set of filter target values. These filter target values, taken as a whole, form a "filter target pattern". The next and last step is to use these filter target values to produce a "synthesized digital waveform". The synthesizer unit takes these filter target values as input, and produces as output a synthesized digital waveform that has the property that if the synthesized digital waveform were provided as input to the set of digital filters, then the resulting output pattern would be similar to the filter target pattern. The synthesized digital waveform is the output of the invention. Optionally, the synthesized digital waveform is provided as input to a digital-to-analog (D/A) converter to produce an analog synthesized acoustic signal.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
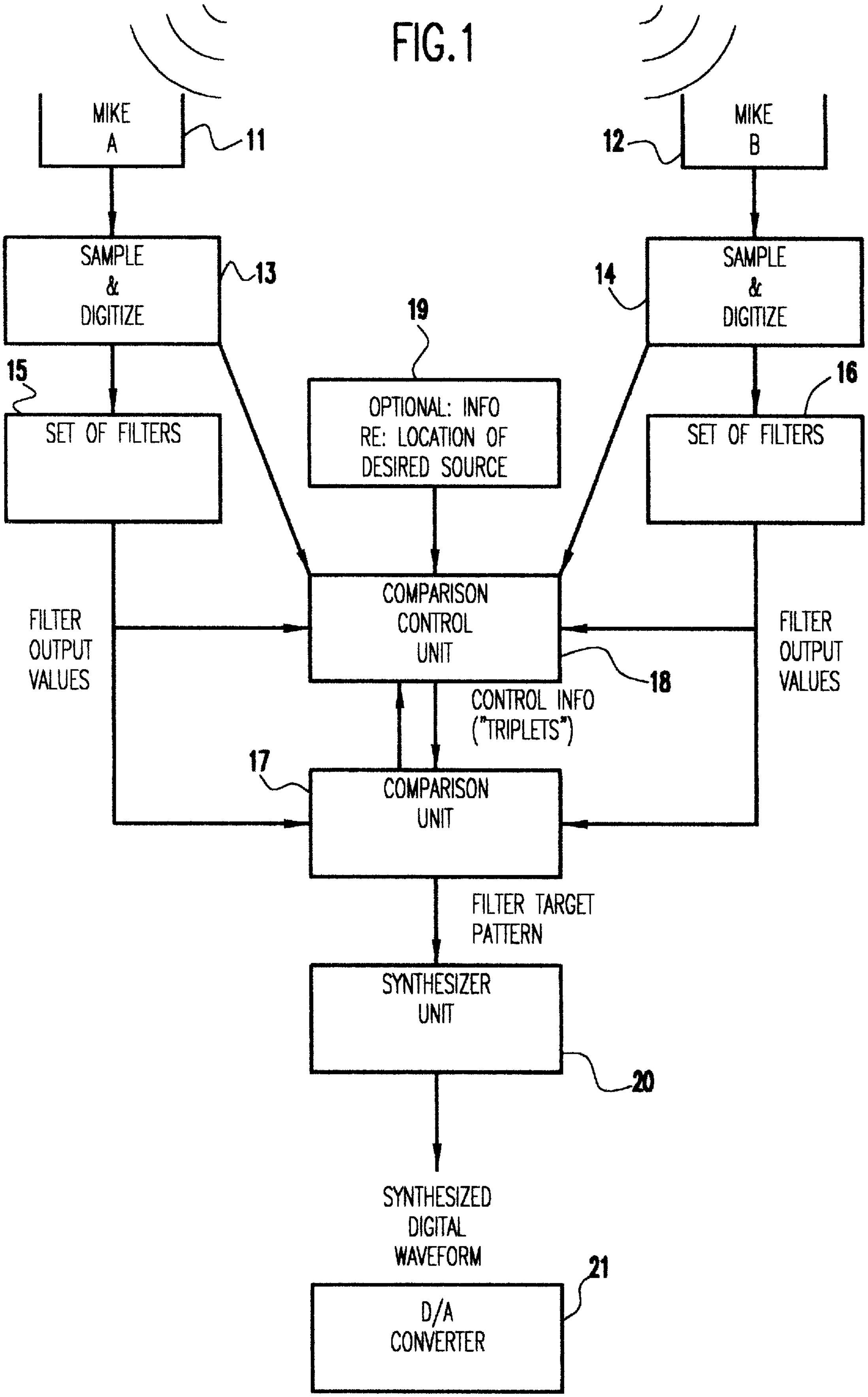
FIG. 1 is a block diagram of the main components of the invention showing their interrelationship.

Referring now to the drawings, and more particularly to FIG. 1, there is shown an exemplary apparatus for the practice of the invention. Two microphones 11 and 12 at different locations detect variations in sound pressure level resulting from the activity of a plurality of acoustic sources at different locations. In general, the number of acoustic sources is greater than the number of microphones. Output from the microphones is sampled and digitized in respective sampler and digitizers 13 and 14. The resulting digital waveform from each microphone is provided as input to a corresponding filter bank 15 and 16. The filters which compose each of these filter banks are digital filters. The output from each filter bank is provided as input to a comparison unit 17.

A comparison control unit 18 generates "signature" information (including the "relative gain", "relative time delay", and "residual phase shift") that characterizes each source with respect to the two microphones. Input to the comparison control unit is from one or more of (a) the sampler/digitizer units 13 and 14, (b) the filter banks 15 and 16, (c) ancillary information 19 regarding source locations, and (d) the comparison unit 17 (providing a feedback loop). The comparison unit 17 receives input from the comparison control unit 18 and from the filter banks 15 and 16. Output of the comparison unit 17 is provided as input to a synthesizer unit 20 which produces a synthesized digital waveform for each source that it is desired to reconstruct. Optionally, the synthesized digital waveform from the synthesizer unit 20 can be input to a digital-to-analog (D/A) converter 21 to generate an analog reconstruction of the selected acoustic source.

Figure 2:
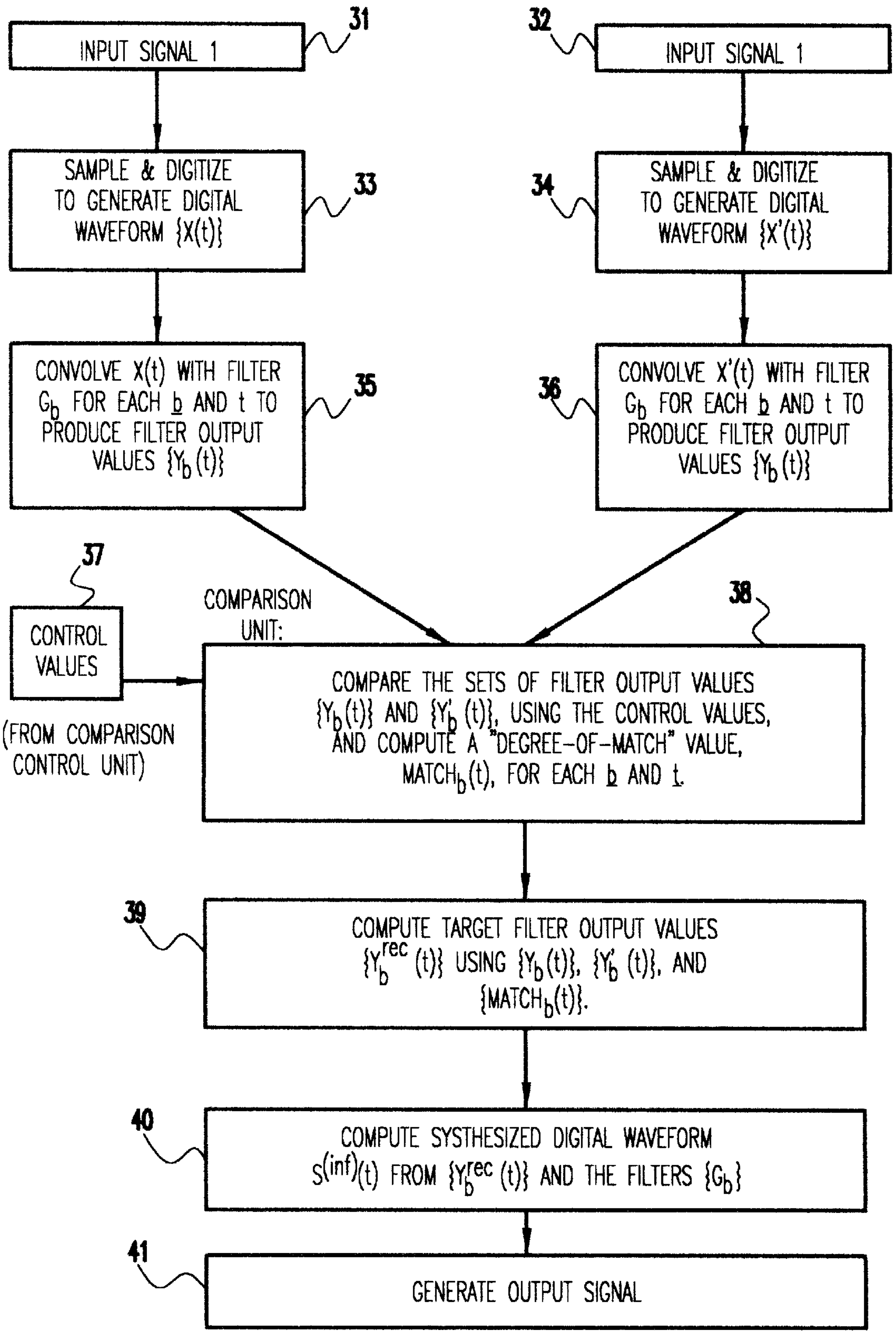
FIG. 2 is a flow diagram of the acoustic processing method according to the invention.

In operation, as shown more particularly in FIG. 2 and with continued reference to FIG. 1, a mixture of acoustic sources produces a time-varying sound pressure level (acoustic input signal) at each spatial location of the two microphones 11 and 12. Each of the two acoustic input signals at input blocks 31 and 32 is sampled and digitized to produce a digital waveform in function blocks 33 and 34, respectively. Each of the two digital waveforms (called digital waveforms A and B) is provided as input to one of filter banks 15 and 16 (FIG. 1).

Each filter bank comprises a set of filters that are chosen or designed to produce "sparse representations" (as described below). The filters are digital filters. The output values of each digital filter at each of a plurality of discrete times is a complex-valued number, called the "filter output value". For each of the two digital waveforms (A and B, respectively), the set of these filter output values (over a plurality of times, and for the entire set of filters) is referred to as "filter output pattern A" and "filter output pattern B", respectively, from function blocks 35 and 36. Any particular filter output value of a filter output pattern is identified by a "label" L that uniquely describes both (a) the index of the filter that generated that filter output value and (b) the time at which it was generated.

Next, the comparison control unit 18 generates a set of "comparison triplets" where each triplet comprises a first label, a second label, and a set of one or more comparison parameters. The input from the comparison control unit is shown at input block 37. The operation of the comparison control unit, that is, how the triplets are computed, will be described later with reference to FIG. 5. For the $i^{th}$ triplet ($L_{Ai}$, $L_{Bi}$, params), the filter output value of filter output pattern A that has the label $L_{Ai}$ is compared in function block 38 (by the comparison unit 17) to the filter output value of filter output pattern B that has the label $L_{Bi}$. The comparison consists of computing a function of (a) these two quantities and (b) the comparison parameters. The result of the comparison is a decision that the pair of filter output values is a "match" or a "non-match". If the result is a "match", the two filter output values are used in function block 39 to compute a complex-valued number called the "filter target value" (denoted $T_i$) for the $i^{th}$ triplet. If the result is a "non-match", the filter target value is defined to be zero. This procedure is carried out for the indices (one or more of i=1,2, . . . ,n) of those sources that are to be reconstructed.

At this point, the method has generated a set of filter target values. These filter target values, taken as a whole, form a "filter target pattern". The next (and last) step is to use these filter target values in function block 40 to produce a "synthesized digital waveform". A synthesizer unit 20 (FIG. 1) takes these filter target values as input, and produces as output a synthesized digital waveform that has the following, property: If one were to take the synthesized digital waveform and provide it as input to the above-mentioned set of digital narrow-bandpass filters, then the resulting output pattern would be similar to the filter target pattern. The synthesized digital waveform is the output of the invention at function block 41. Optionally, the synthesized digital waveform is provided as input to a digital-to-analog D/A converter to produce an analog synthesized acoustic signal.

Returning to a consideration of the filter banks used in the practice of the invention, a "sparse representation" is a set of values, obtained by processing an input stream of values (e.g., a received waveform), that has the properties that (a) all but a small fraction of the values are clustered near zero, and (b) the values that are far from zero convey a substantial amount of the information needed to reconstruct the input stream to a sufficiently good approximation. If a histogram is constructed showing the fraction of the set of values that lies within each of many "bins" of values, a set of values comprising a sparse representation will have a large peak near the zero value, and long shallow "tail(s)" (at positive values, negative values, or both) corresponding to the values that are far from zero. By comparison, a "normal" or "Gaussian" distribution has the familiar bell-shaped curve histogram. If the statistical variance of a normal and a "sparse-representation" distribution are equal, then the "sparse" distribution will have a taller peak and longer tails than the normal distribution. Mathematically, a quantity called "kurtosis" measures an aspect of this shape difference. A "sparse representation" distribution will have positive kurtosis, while the normal distribution has zero kurtosis.

In the present invention, the set of filters is chosen as follows. A general form of the set of filters is chosen, based on available knowledge. This general form has one or more parameter values that must be chosen in order to define the filter set. These parameter values are chosen such that a measure of sparseness (preferably the kurtosis) is maximized or made large over the relevant range of frequencies, and for the relevant type of sounds for which the invention is to be used (in the preferred embodiment, speech sounds).

In the preferred embodiment, the general form of the filter set is a set of "log-Gabor filters" (defined below); see also D. J. Field, "Relation between the statistics of natural images and the response properties of cortical cells", *J. Optical Society of America A*, Vol. 4, No. 12, Dec. 1987, page 2389.

A "log-Gabor filter" is mathematically closely related to the more familiar "Gabor filter". (Also, for the parameter values that are chosen for the preferred embodiment, the two filters are very similar in actual function, and the choice of one over the other makes no practical difference. However, for other parameter values, the two filters are less similar, and one may be found preferable over the other, in the sense of providing a more sparse representation of output values.)

Figures 3A, 3B:
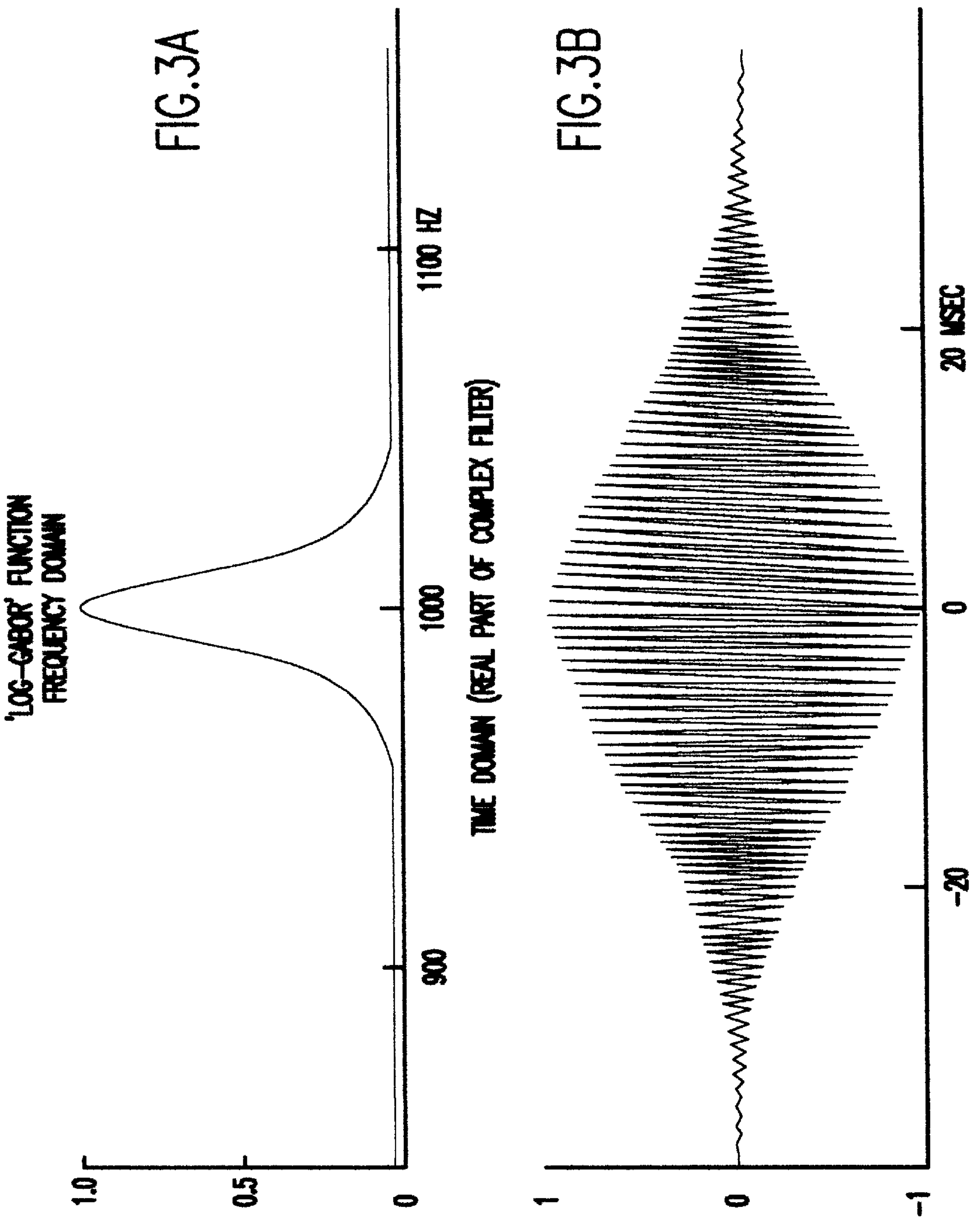
FIGS. 3A and 3B are graphs of a mathematically-defined "log-Gabor" function in the frequency domain (value of the function plotted versus frequency) and of the real part of the same function in the time domain (real part of the complex-valued function plotted versus time), respectively.

A filter can be described in either the time domain (i.e., as a function of time) or the frequency domain (via a Fourier transform). The Gabor filter is a Gaussian function in the frequency domain, and is the product of a Gaussian function times a sinusoidal function in the time domain. The log-Gabor filter (described mathematically below) is defined in the frequency domain as a Gaussian function of the logarithm of frequency. When the width of the Gaussian function is narrow compared with its center frequency, then the log-Gabor filter is very similar to the Gabor filter, and (like the Gabor filter) it has the appearance of a sinusoidally varying function of time, where the sinusoid envelope is modulated by a Gaussian function. Thus, the Gabor (and log-Gabor) filters are localized, that is, they have limited extent, in both time and frequency. Graphs showing examples of a log-Gabor filter in the frequency and the time domains are shown in FIGS. 3A and 3B, respectively.

Figure 4:
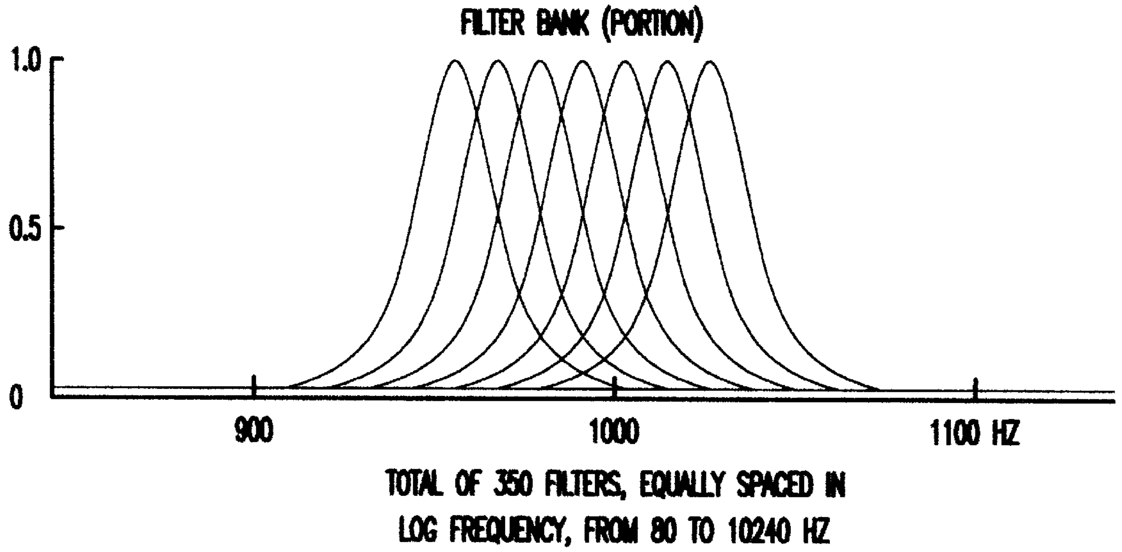
FIG. 4 is a graph of the "log-Gabor" functions (in the frequency domain) that comprise a portion of a filter bank.

In the preferred embodiment, a set of log-Gabor filters (or "filter bank") is chosen that spans frequencies from 80 Hz to 10,240 Hz; that is, seven octaves spanning the range of human speech (and many other sounds of interest). A smaller range will suffice for most applications. At each of several frequencies, a parameter defined as the ratio of the bandwidth of the filter (the "full width at half maximum" of the Gaussian function of the logarithm of frequency) to the center frequency of the filter was varied, sample of speech were provided as input to the filter, and the kurtosis of the (real and imaginary parts of the) output values from the filter was computed. The value of the parameter was chosen to maximize the kurtosis. While the best value of the parameter is found to vary somewhat with the center frequency of the filter, it is convenient to choose a single value of the parameter for all the filters (so that all filters have the same shape as a function of log(frequency)). A preferred value of the parameter is found to be such that at a center frequency of 1000 Hz, the envelope of the sinusoid of the filter (in the time domain) has a FWHM of about 1/30 sec. Since all the filters are chosen to have the same shape (they are "self-similar"), note for example that a filter at a center frequency of 500 Hz will have (in the time domain) an envelope with a FWHM of 1/15 sec. A graph representing a portion of the filter bank is shown in FIG. 4.

In the preferred embodiment, a received signal X(t) is filtered through a set of overlapping narrow pass filters $G_b(\Delta t)$ to give output $Y_b(t)$:

$$Y_b(t)=\Sigma_{\Delta t}G_b(\Delta t)X(t-\Delta t).$$

The subscript "b" identifies the particular filter within the filter bank (e.g., a filter having a particular center frequency). The equation shows mathematically that the received signal X(t) is convolved with each filter $G_b$ to produce the filter output values $Y_b(t)$. (See function blocks 35 and 36 in FIG. 2.) Likewise, the received signal X' is convolved with each filter $C_b$ to produce the filter output values $Y'_b(t)$. The passband widths are chosen so that when speech from a single speaker is presented as input, the distribution of output values from each filter has large kurtosis. That is, the $Y_b$ distribution is far from Gaussian, and has long tails. As a result, large (in absolute value) $Y_b(t)$ values (for single-speaker input) will be sparsely distributed over time and the set of filter bands. Therefore, a substantial number of the large output values will each We attributable to just one of the sources.

As stated above, for a convenient filter form, we use the "log-Gabor" filter. The Fourier transform of this filter is by definition a Gaussian function of $u \equiv \ln f$ centered at $u_b \equiv \ln f_b$:

$$\hat{G}(f)=\exp\left[\frac{-(u-u_b)^2}{2\sigma^2}\right]$$

350 overlapping bands (50 bands/octave) are used ranging from center frequencies $f_b$=80 to 10240 Hz, uniformly spaced in lnf, and σ=1.0133 is used to obtain large output kurtosis. (This value of σ is used because the choice of $\sigma f_b$=0.304 was found to be near-optimal for several speech samples, at a center frequency of $f_b$=0.3 rad/sample point=0.3×(22,000 sample points/sec)×(1 cycle/2Πrad)=1050 Hz, and because the same σ gave large though not necessarily maximal kurtosis values at other center frequencies.) (For such a narrow bandwidth, the log-Gabor and conventional Gabor filters are very similar.) Each filter has a complex-valued output $Y_b(t)$.

Figure 5:
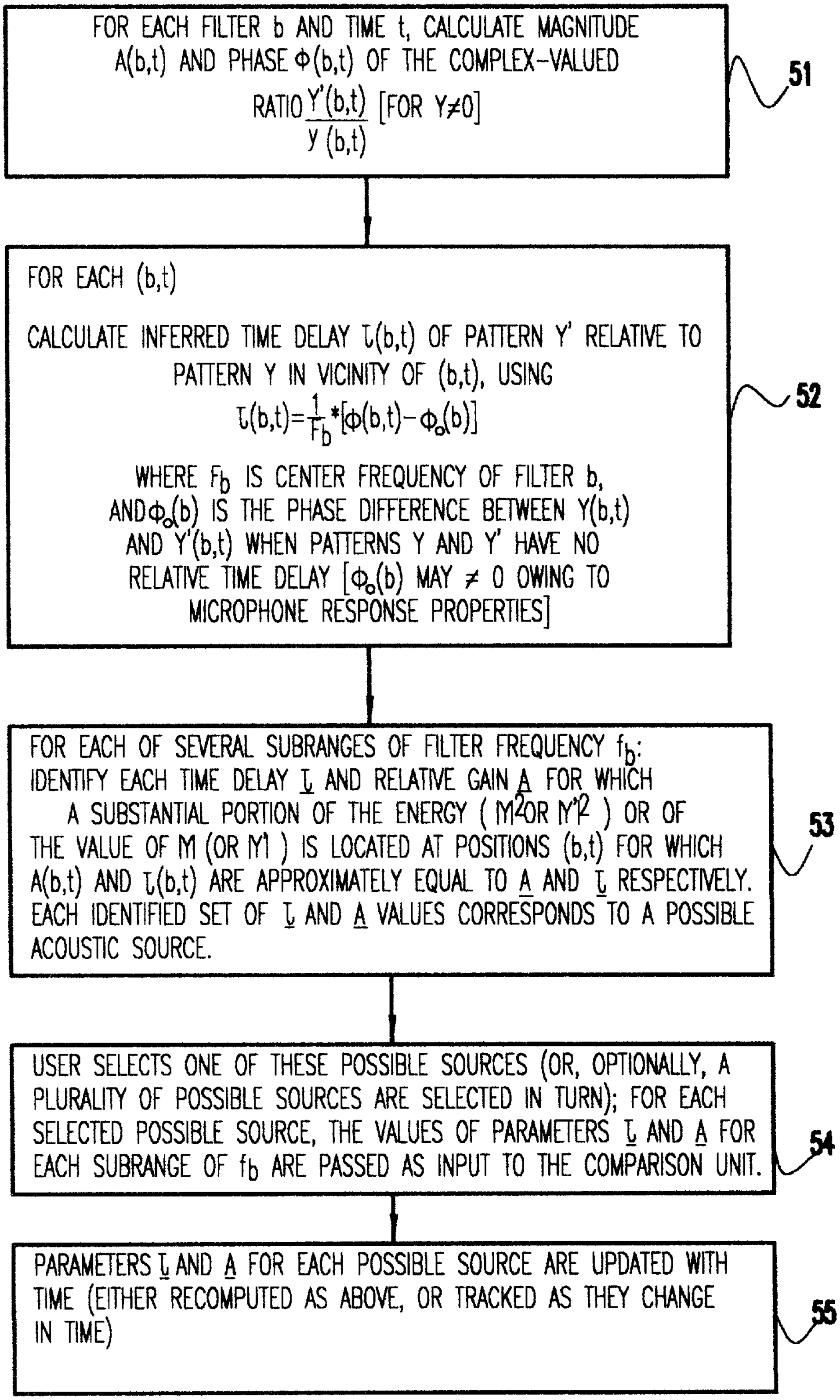
FIG. 5 is a flow diagram showing details of the operation of the comparison control unit in a preferred embodiment of the invention.

The operation of the comparison control unit 18 (FIG. 1) is illustrated in FIG. 5. Each of the speech sources has a particular physical location. A variety of factors, including the distances from this location to each of the two stereo input microphones, the direction in which the speech source is positioned, the directional response properties of the microphones, the absorption, reverberation, and multipath properties of the environment, and other factors, will cause the acoustic waveforms measured at the two microphones to differ in specific ways. It is assumed that these properties are either unchanging, or change slowly compared with the changes in the content of the speech. At each acoustic frequency, the signal received at microphone B will differ from that received at microphone A by a gain (amplification) factor and a phase shift. The gain factor and phase shift at each frequency will change only slowly with time (owing to the above assumption).

The first step in the process implemented by the comparison control unit is shown in function block 51. For each filter b and time t, the magnitude (amplitude) A(b,t) and phase φ (b,t) of the complex-valued ratio $$\frac{Y'(b,t)}{Y(b,t)},$$

for Y≠0, is computed.

For each source to be reconstructed according to the present invention, the comparison control unit 18 selects a value of the gain factor and phase shift for each frequency. In many cases the main contributor to the phase shift is the fact that the time delay for the sound pressure wave from the source to one microphone differs from the time delay from the source to the other microphone. This difference is referred to as the "relative time delay". In this case it is preferable to use this relative time delay information to determine that the filter bank outputs from one microphone at each time t are to be compared with the filter bank outputs from the other microphone at the appropriately shifted time $t+\tau_{shift}$.

In function block 52, the inferred delay τ (b,t) of pattern Y' relative to pattern Y in the vicinity of (b,t) is calculated using $$\tau(b,t)=\frac{1}{f_b}\times[\phi(b,t)-\phi_0(b)],$$

where $f_b$ is the center frequency of filter b and $\phi_0(b)$ is the phase difference between Y(b,t) and Y' (b, t) when patterns Y and Y' have no relative time delay. ($\phi_0(b)$ may $\neq 0$ owing to microphone response properties.) Next, in function block 53, for each of several subranges of filter frequency $f_b$, the time delay $\tau$ and relative gain A are identified for which a substantial portion of the energy ($|Y|^2$ or $|Y|^2$) or of the value of $|Y|$ (or $|Y'|$) is located at positions (b, t) for which A(b,t) and $\tau$ (b, t) are approximately A and $\tau$ respectively. Each identified set of $\tau$ and A values corresponds to a possible acoustic source.

Also, in many cases, the gain factor is substantially constant over a wide range of frequencies, or slowly varying with frequency, although there may also be cases in which the gain factor (for one microphone relative to the other) has significant additional structure as a function of frequency.

The gain factor (as a function of frequency), the overall time shift, and any residual phase shift (as a function of frequency) (note that "residual" means "after taking into account the overall time shift") are preferably determined by measuring the properties of each source when that source is the only active source, if such a period of time is available. (In other words, there may be silent periods for the sources at other locations.) The properties are preferably measured (if the variation of gain and/or phase shift with frequency is not too great) by determining which choice of overall gain factor and time delay (of the input signal to one microphone relative to the other) produces a best match between the two signals (smallest difference, measured, e.g., according to the root-mean-square difference between the two signals, after the gain factor and time delay are applied). Alternatively, the time delay may be determined by maximizing the correlation between the signal measured at one microphone and the time-delayed signal measured at the other microphone, in a manner familiar in the art.

When the gain and/or phase shift varies significantly with frequency, it is preferable to use the filter bank output values for each frequency band, and find the optimal time delay (or phase shift) and gain that brings the two corresponding filter bank output values into approximate equality. Alternatively, the ratio of the complex outputs of the filter banks gives the gain factor (i.e., the magnitude of the ratio) and the relative phase shift (the argument $\phi$ of the complex ratio Aexp ($i\phi$))

If there is no time span (sufficiently long to obtain reliable statistics) over which only one source is active, one can determine the gain and phase shift for each source as follows: Compute the gain and phase shift by taking the ratio of the filter bank complex output values as specified above. Accumulate statistics over many values of (b,t) and form a histogram that shows how much cumulated value of the magnitude of the filter bank output, or the magnitude of its square (which is proportional to the energy at (b,t)) is associated with each value (or range of values) of relative gain and phase shift (or relative time delay corresponding to the phase shift at each frequency). Find which values of the pair (gain, phase shift or time delay) have the dominant amounts of the cumulated output magnitude or energy. Identify these pairs as corresponding to the active sources. Track the pairs over time to check that the identifications made are persistent over time, or change gradually over time (e.g., corresponding to motion of the sources or changes in the transmission environment). Select a best value of the pair (at each band, b, based on the evidence from both instantaneous measurement and tracking over time, using standard methods of curve fitting. (The same method can be used if there is only one active source during some time period, or over some frequency range.)

In function block 54, a user-specified one of the possible sources is selected (or, optionally, a plurality of possible sources are selected in turn). For each selected possible source, the values of parameters $\tau$ and A for each subrange of $f_b$ are passed as input to the comparison unit 17 (FIG. 1). Then, in function block 55, the parameters $\tau$ and A for each possible source are updated with time (either recomputed as above, or tracked as they change in time).

If information is available from ancillary evidence (e.g., visual or other means of determining the positions of the sources), this information is preferably included in the operation of the comparison control unit. As described above, the output of the comparison control unit is the information giving the "signature" of each source, i.e., the relative gain and phase shift for the transmission from that source to the two microphones, as a function of frequency and (if changing) as a function of time.

In the comparison unit 17 (FIG. 1), for each set ($A,\tau,\phi$) of gain, time delay, and residual relative phase shift values ("residual" means "phase shift if any that remains after the time delay has been taken into account"), label all (b,t) for which $|Y_b(t)-A^{-1}\exp(-i\phi)Y'_b(t+\tau)$ is sufficiently small. A suitable choice for the examples studied is to take "sufficiently small" to mean smaller than $$TOL\times 0.5<[|Y_b(t)|+A^{-1}|Y'_b(t+\tau)|]>$$

where TOL=0.25 and the angle brackets "< . . . >" denote an average over a time window of about 50 milliseconds preceding or surrounding the time for which the comparison is to be made. Attribute these labeled positions to an inferred source having gain, time delay, and residual phase shift parameters ($A,\tau,\phi$).

In the synthesizer unit 20 (FIG. 1), to reconstruct the inferred source, it is preferable to compute a set of quantities $\{Y_b^{rec}(t)\}$ characterizing the reconstruction:

$$Y_b^{rec}(t)\equiv 0.5[Y(t)+A^{-1}\exp(-i\phi)Y_b(t+\tau)]$$

if (b,t) is a label for which the comparison unit has identified a "match", $$Y_b^{rec}(t)\equiv 0$$

if not a "match".

The set of $Y_b^{rec}(t)$ values comprises a "filter target pattern". We want to compute the inferred source $S^{inf}$ for which the filter outputs $Y^{inf}$ are closest to $Y_{rec}$ in the sense of minimum mean square error. (For computational convenience, we include the "error" made at those locations for which $Y_{rec}$ is zero.) Solving this error minimization problem, we find $$\hat{S}^{inf}(f)=\lfloor\Sigma_b\hat{G}_b(f)\hat{Y}_b^{rec}(f)\rfloor\times\lfloor\Sigma_b\,\hat{G}_b(f)^2\rfloor^{-1},$$

where "hat" denotes the Fourier transform. (For 22 0, $\hat{S}^{inf}(-f)\equiv\hat{S}^{inf}(f)^*$. For frequencies outside the range spanned by the set of filters, e.g., for which $\Sigma_b\hat{G}_b(f)^2<0.1$, we set $\hat{S}^{inf}(f)\equiv 0$.)

Example Problem and Results

There are M>2 acoustic sources $S_1, S_2, \ldots, S_M$. We are given two linear combinations of them:

$$X(t)=\Sigma S_m(t);X(t)=\Sigma A_m S_m(t-\tau_m);$$

where the $(A_m, \tau_m)$ pair is different for each m. We do not assume that the sources must be statistically independent (for example, one "source" may be a time-delayed echo of another). The problem is to reconstruct (approximately) $S_l, \ldots, S_M$.

The example described here is for the case in which the sources are different samples of speech, M=3, $A_m=1$, and the $\tau_m$ are known.

Figure 6A:
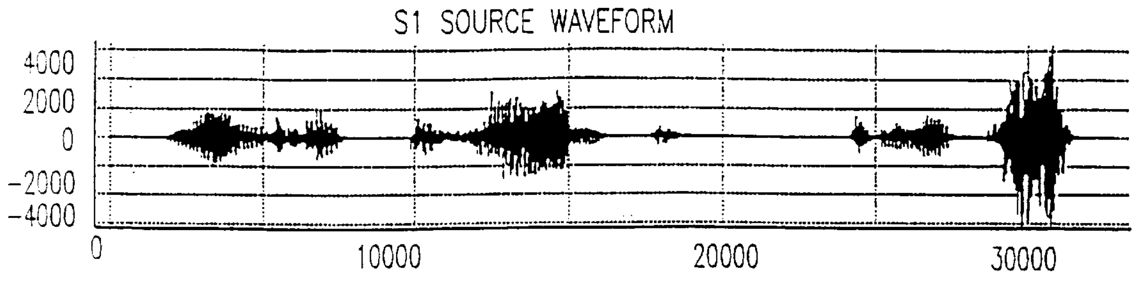
FIGS. 6A, 6B and 6C are oscillographs showing three examples of speech source waveforms.
Figure 6B:
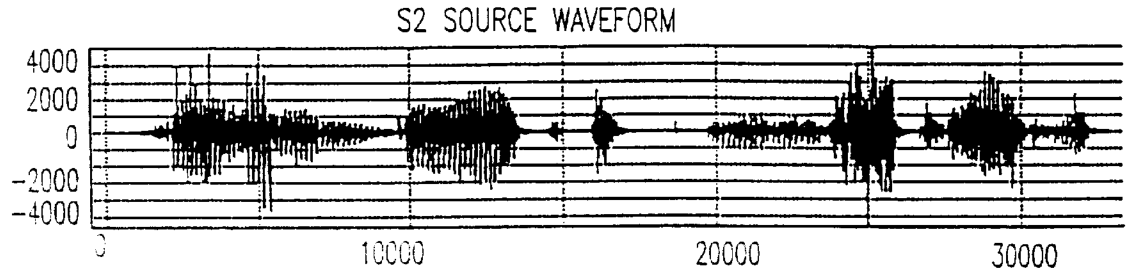
Figure 6C:
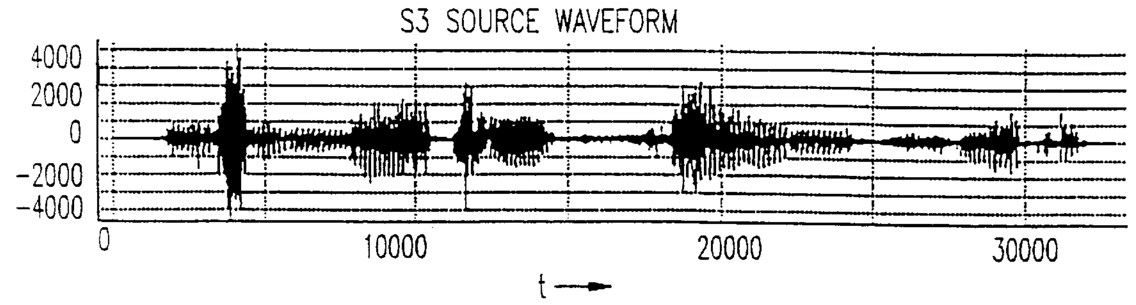
Figure 7A:
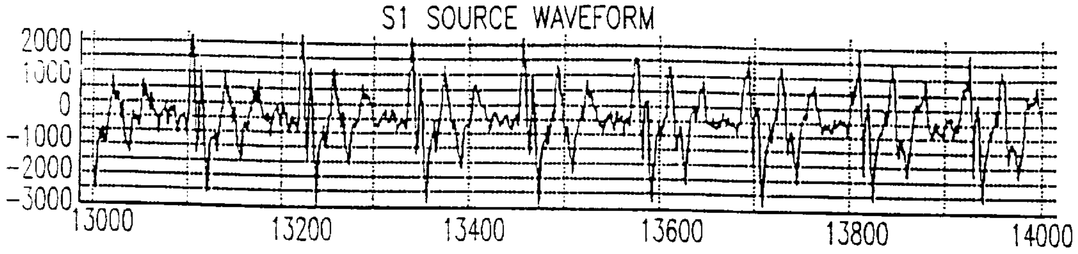
FIGS. 7A, 7B and 7C are time expanded graphs of portions of FIGS. 6A, 6B and 6C, respectively.
Figure 7B:
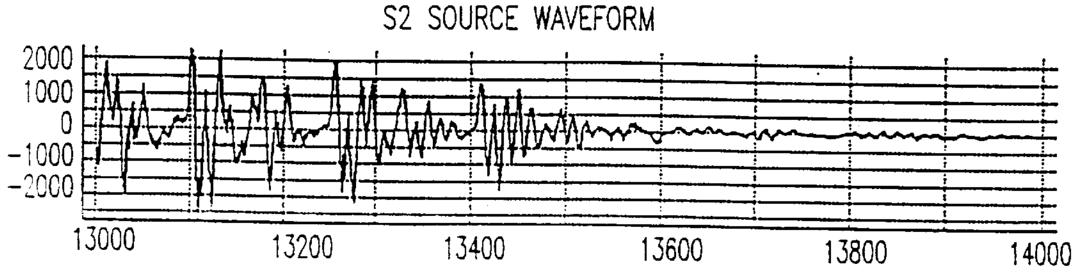
Figure 7C:
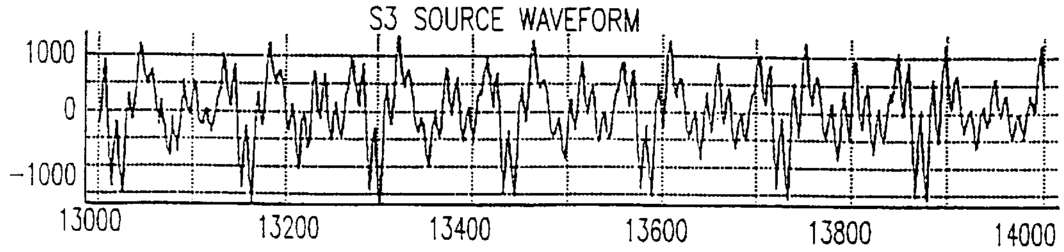

The three source waveforms are shown in FIGS. 6A, 6B and 6C, and time expanded portions of the three source waveforms are shown in FIGS. 7A, 7B and 7C, respectively. Digitized samples are 16-bit, 22,000 sample points/sec.

Mixing parameters used are: $A_1=A_2=A_3=1$; $\tau_1=0$; $\tau_2=5$ sample points=0.227 ms; $\tau_3=11$ sample points=0.5 ms.

Figure 8A:
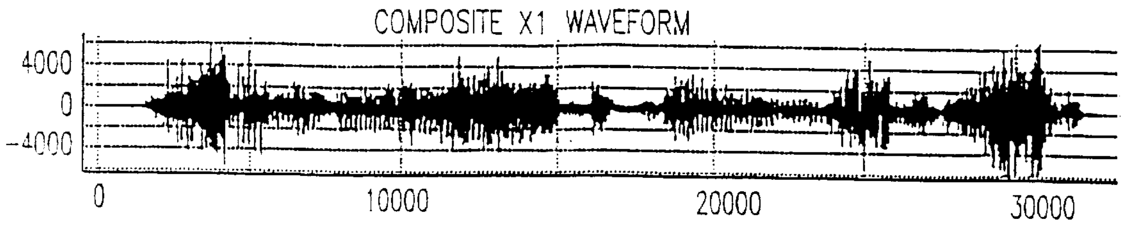
FIGS. 8A and 8B are oscillographs showing examples of two composite waveforms as detected by two microphones in FIG. 1.
Figure 8B:
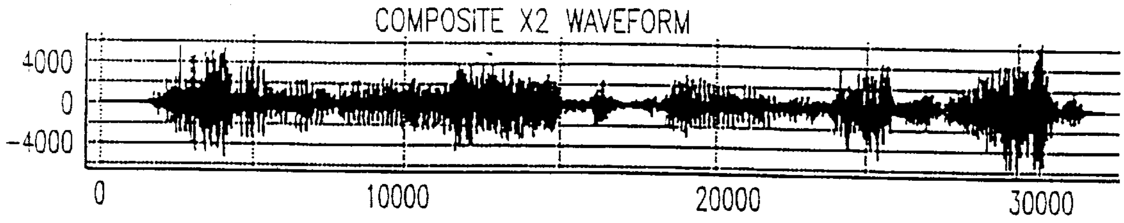
Figure 9A:
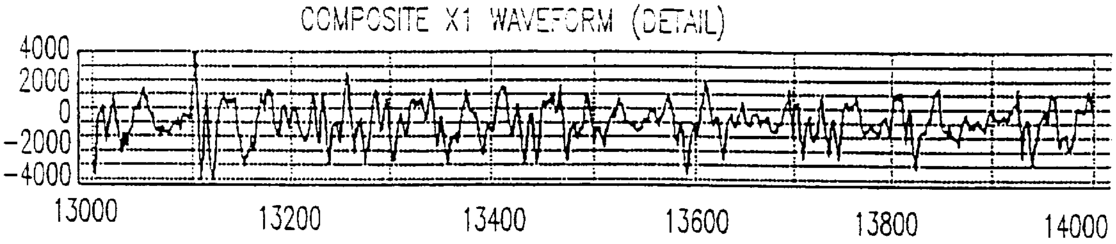
FIGS. 9A and 9B are time expanded graphs of portions of FIGS. 8A and 8B, respectively.
Figure 9B:
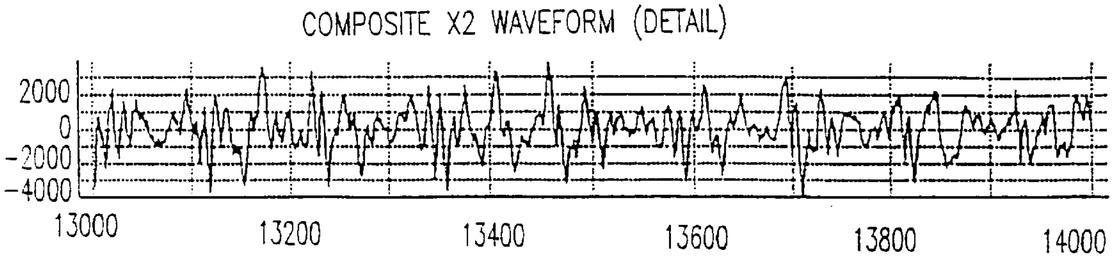

The composite signals X and X' are shown in FIGS. 8A and 8B, and time expanded portions of the composite signals are shown in FIGS. 9A and 9B, respectively.

The long axis in each of these figures denotes time (total duration 32768 samples or approximately 1.5 seconds). The short axis denotes frequency on a logarithmic scale (640 Hz at the top of the short axis, 1280 Hz at the bottom of the axis).

Figure 10A:
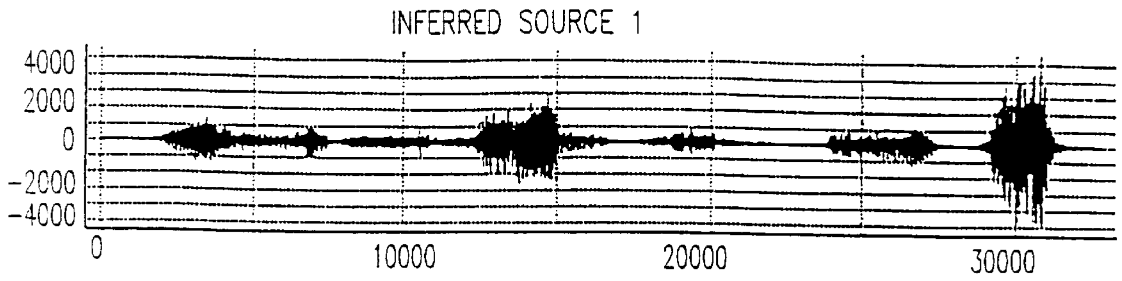
FIGS. 10A, 10B and 10C are oscillographs of three inferred sources as a result of acoustic processing according to the invention.
Figure 10B:
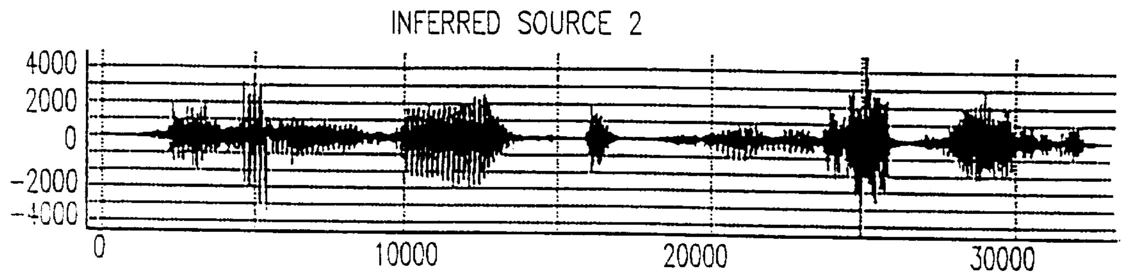
Figure 10C:
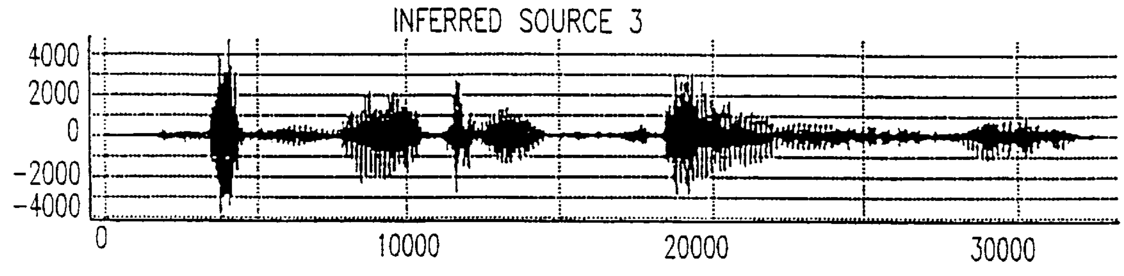
Figure 11A:
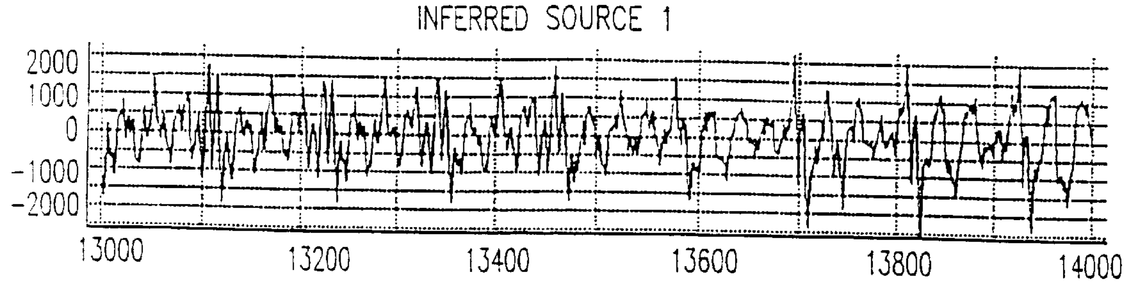
FIGS. 11A, 11B and 11C are time expanded graphs of portions of FIGS. 10A, 10B and 10C, respectively.
Figure 11B:
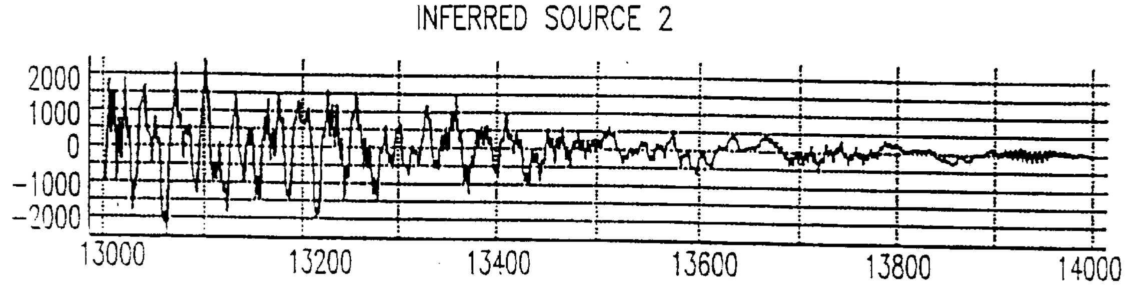
Figure 11C:
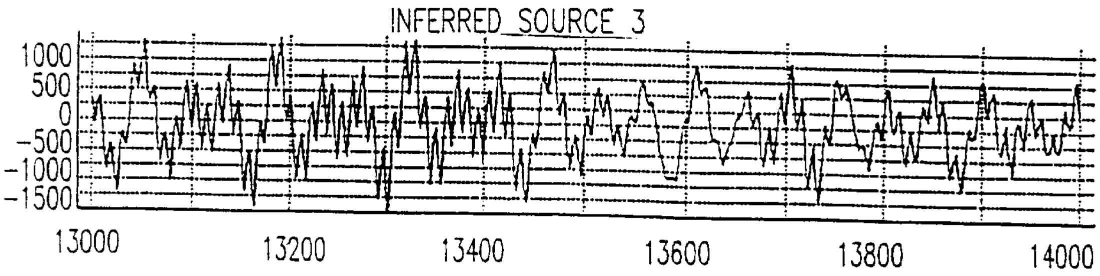

Setting A=1 and setting, in turn, $\tau$=0,5, and 11 sample points, yields the inferred sources $S_m^{inf}$ for m=1,2,3, respectively. FIGS. 10A, 10B and 10C show the interred sources $S_m^{inf}$ that would yield filter values closest to $\{Y^{rec}\}$ for each m in turn. Time expanded portions of the inferred signals are shown in FIGS. 11A, 11B and 11C, respectively.

Description and Operation of Alternative Embodiments

Filter Properties: Instead of using the Gabor or log-Gabor filters, one may use a different set of filters provided the set (a) spans the required signal frequency range for purposes of adequate signal reconstruction, and (b) provide a sparse representation (as defined earlier) when applied to input signals having the statistical properties of the signals in the mixture to be separated.

Gain and Phase Shift Histograms: When constructing the histogram to determine the "signatures" of the various sources, one can compute the magnitude and phase of the complex ratio of the filter bank output values. An allowed tolerance can then be applied to determine the "match" criterion for each source, as a function of filter bank band. A time delay may also be used (this will change the phase shift to the "residual phase shift"), but need not be.

Alternative Synthesis Criterion: Instead of synthesizing a "synthesized digital waveform" whose filter output pattern is as similar as possible to the filter target pattern, where the filter target value has been set to zero at all points that have been deemed "non matches", one can alternatively synthesize a "synthesized digital waveform" that is as similar as possible to the observed filter bank output values at those points (filter bands and times) that have been deemed "matches" and also at those points for which the observed filter bank output value was small in magnitude, while ignoring or decreasing the significance of (in the similarity calculation) the degree of similarity between the filter bank output value of the synthesized digital waveform and the observed filter bank output value at those points that have been identified as "matches" corresponding to a different source.

Using Filter Bank Outputs That Are Not "Matches" to a Pure Source: When there are two microphones, one can exploit the information contained in those patches of the filter bank output space [the mathematical plane whose axes are the filter index (e.g., the center frequency of the filter) and time] that are not labeled as "pure" (or "matched") patches, as follows.

For a sparse representation, it is typical that most patches containing substantial energy will either be caused substantially by one source (a "pure" patch) or by an overlap of two sources. (Triple overlaps will be rarer.) When there is an overlap of two sources, and the signatures (relative gain and time delay and/or phase shift) of the two sources are known (i.e., it is known which two of the sources have caused the patch), then the linear equations relating the two sources to the two received signals at the microphones can typically be inverted to yield the contribution from each source. When this is done, the recovered contribution of the desired source to the mixed patch is to be included in the set of filter bank outputs (along with the results of selection or labeling of the "pure" patches for the desired source). This composite set of selected and recovered filter bank outputs is passed as input to the synthesizer unit.

In order to identify which two sources are substantially responsible for a mixed patch, one can use information obtained from knowing which sources are responsible for the "pure" patches that are substantially contiguous to the mixed patch in question. Additionally, one can use information obtained (see below) from "linked" patches in the filter bank output "plane".

Use of "Linking" of Patches of Output: Various criteria can be used for identifying different portions of a composite speech signal as having an increased chance of "belonging" to the same speech feature. These criteria include common time of onset or offset of portions of the signal at different frequencies, as discussed for example in the book *Auditory Scene Analysis* by Albert Bregman (*1990*). An alternative embodiment of the invention uses such criteria to bias the assignment of a patch in the filter bank output "plane" to a particular inferred source, based on the assignments, to particular inferred sources, of other patches in the plane that share a common property such as the above.

Use of Pitch Repeat Evidence, With One or More Microphones: It is also possible to use pitch repeat evidence, with one or more microphones. When the sound source is speech or some other signal having a discernable pitch, then patches of energy in the filter bank output "plane" will tend to recur at time intervals equal to the pitch period (at least within a certain range of frequency bands). An alternative embodiment uses this pitch repeat information to assign, or aid in assigning, "pure" patches to particular sources, based on the measured or inferred pitch of the source. In general, the pitch varies and therefore needs to be tracked. (Means for inferring and tracking the pitch of a source have been described in the prior art.) Note that this embodiment docs not require that the sources be at different positions in space (although such information is preferably used also if available), and does not require that there be more than one microphone. To the useful, however, it does require that at least two of the sources have different pitches. Two sources may have varying pitches that follow trajectories that intersect one another, in which case a particular trajectory is assigned to the appropriate source.

The approximate reconstruction of a source signal having a particular pitch repeat time period, from a mixture of source signals having different pitch repeat time periods, with only one received microphone input available, is accomplished by using the method described above for two microphone inputs, except that there is only one received signal train X(t) and therefore only one Y(b,t), that is, Y'

(b,t)=Y(b,t), and the inferred time delay is the time duration from a given portion of the filter pattern Y(b,t) to the next occurrence of substantially the same portion of pattern. This time duration is identified as the value of the pitch repeat time period; it is used to distinguish among signals of different pitch, in a manner similar to the way in which the relative time delay (of a signal to two microphones) is used to distinguish among signal having different relative time delays.

Choice of Filtering Means: There are several choices of filtering means. Instead of sampling and digitally filtering the signal received at a microphone before passing the digitized signal through a filter bank, one may use an analog filter bank to process the signals. If an analog filter is used, then the operation of computing a complex-valued filter output (described earlier for a digital filter) is preferably performed using a pair of analog filters. One filter of each pair computes the real part of the complex (e.g., Gabor or log-Gabor) filter function, and the other filter of each pair computes the imaginary part.

Also, if digital processing is used, one alternatively may use either special-purpose hardware to perform the filtering, or programmable digital signal processors (DSPs).

While the invention in a method and apparatus for reconstructing an acoustic signal that substantially matches one of a plurality of sources while eliminating other interfering sources has been described in terms of a preferred embodiment and several alternative embodiments, those skilled in the art will recognize that the invention can be practiced with modification within the spirit and scope of the appended claims.

Having thus described my invention, what I claim as new and desire to secure by Letters Patent is as follows:

1. A signal processing method which reconstructs an acoustic signal that substantially matches a selected one of a plurality of sources comprising the steps of:

creating a time-frequency representation of a composite acoustic signal generated by said plurality of sources;

comparing selected regions of the time-frequency representation;

assigning a plurality of non-zero energy regions of the compared regions to a single source wherein, for at least a first of said non-zero energy regions that is assigned to a single source there are at least second and third non-zero energy regions that are not assigned to said single source, such that (a) said second non-zero energy region shares the same frequency range as said first non-zero energy region; and (b) said third non-zero energy region shares the same time range as said first non-zero energy region;

and reconstructing the selected one of the plurality of acoustic sources from the set of assigned non-zero energy regions.

2. A signal processing method which reconstructs an acoustic signal that substantially matches a selected one of a plurality of sources comprising the steps of:

creating a time-frequency representation of a composite acoustic signal generated by said plurality of sources;

comparing selected regions of the time-frequency representation using pitch repeat information from the time-frequency representation;

assigning a plurality of non-zero energy regions of the compared regions to a single source; and reconstructing the selected one of the plurality of acoustic sources from the set of assigned non-zero energy regions.

3. A signal processing method which reconstructs an acoustic signal that substantially matches a selected one of a plurality of sources comprising the steps of:

(a) detecting at each of a plurality of locations a composite acoustic signal;

(b) sampling and digitizing the detected composite acoustic signals to generate a plurality of digital waveforms;

(c) digitally filtering the digital waveforms to produce filter output values at each of a plurality of discrete times, a set of filter output values over a plurality of times constituting a filter output pattern, each filter output value of a filter output pattern being uniquely identified by an index of a filter that generated that filter output value and a time at which it was generated;

(d) generating control information including a set of comparison parameters;

(e) comparing output values having indexes and times that are specified by said control information by computing a function of these quantities and comparison parameters and determining whether or not the output values are a match;

(f) if a result of the comparison is a match, using the output values to compute a filter target value;

(g) repeating steps (e) and (f) a plurality of times to generate a set of filter target values which, taken as a whole, form a filter target pattern; and (h) using the filter target values to produce a synthesized digital waveform that has the property that if the synthesized digital waveform were filtered, the resulting output pattern would be similar to the filter target pattern at those positions where the filter target pattern is defined.

4. The signal processing method recited in claim 3 wherein, in step (e), the indexes and times specified by the control information are the same index and time for each of the filter output values that are compared to one another.

5. The signal processing method recited in claim 3 further comprising the step of selecting digital filters used in the step of digitally filtering by choosing filters with a measured parameter of a degree of a sparse-representation property that is made large over a range of frequencies and for a relevant type of sounds.

6. The signal processing method recited in claim 5 wherein the measured parameter of the degree of the sparse-representation property of the filters is the kurtosis.

7. The signal processing method recited in claim 5 wherein the selected filters are substantially log-Gabor filters.

8. The signal processing method recited in claim 5 wherein the selected filters are substantially Gabor filters.

9. The signal processing method recited in claim 3 wherein the step of generating control information comprises the steps of:

selecting a value of gain factor and phase shift for each frequency for a source to be reconstructed;

tracking a gain factor/phase shift pair over time; and outputting information based on the selected and tracked gain factor/phase shift pair a signature of the source to be reconstructed.

10. The signal processing method recited in claim 3 further comprising the step of converting the synthesized digital waveform to produce an analog synthesized acoustic signal.

11. An acoustic signal processing apparatus for reconstructing an acoustic signal that substantially matches a selected one of a plurality of sources comprising:

a plurality of microphones positioned at different spatial locations detecting variations in sound pressure level resulting from the activity of a plurality of acoustic sources at different locations;

a plurality of sampling and digitizing units, one for each said microphone, sampling and digitizing detected variations in sound pressure levels at each said microphone to produce digital waveforms from each microphone;

a plurality of filter banks each respectively receiving a digital waveform from each microphone and producing filter output values at each of a plurality of discrete times, a set of filter output values over a plurality of times constituting a filter output pattern, each filter output value of a filter output pattern being uniquely identified by an index of a filter that generated that filter output value and a time at which it was generated;

a comparison unit receiving outputs from the plurality of filter banks;

a comparison control unit generating signature information that characterizes at least one source with respect to the microphones and supplying the signature information of a selected source to the comparison unit, said comparison unit comparing output values having indexes and times that are specified by said signature information by computing a function of these quantities and comparison parameters and determining whether or not the output values are a match, and if a result of the comparison is a match, using the output values to compute a filter target value, thereby generating a set of filter target values which, taken as a whole, form a filter target pattern; and a synthesizer unit receiving the filter target pattern from the comparison unit and producing a synthesized digital waveform for the selected source.

12. The acoustic signal processing apparatus recited in claim 11 wherein the filter banks comprise digital filters having a measured parameter of a degree of sparse-representation that is made large over a range of frequencies and for a relevant type of sounds.

13. The acoustic signal processing apparatus recited in claim 12 wherein the measured parameter of the degree of sparse-representation of the digital filters is the kurtosis.

14. The acoustic signal processing apparatus recited in claim 12 wherein the digital filters are substantially log-Gabor filters.

15. The acoustic signal processing apparatus recited in claim 12 wherein the digital filters are substantially Gabor filters.

16. The signal acoustic signal processing apparatus recited in claim 11 wherein the comparison control unit comprises:

means for selecting a value of gain factor and phase shift for each frequency for a source to be reconstructed;

means for tracking a gain factor/phase shift pair over time; and means for outputting information based on the selected and tracked gain factor/phase shift pair as the "signature" of the source to be reconstructed.

17. The acoustic signal processing apparatus recited in claim 11 further comprising a digital-to-analog (D/A) converter connected to receive the synthesized digital waveform from the digital synthesizer unit to generate an analog signal of the reconstructed source.

18. The signal processing method recited in claim 3, wherein the number of said sources is greater than the number of said locations.

19. The acoustic signal processing apparatus recited in claim 11, wherein the number of said sources is greater than the number of said microphones.

* * * * *